United States Patent [19]

Beamer

[11] Patent Number: 5,097,892

[45] Date of Patent: Mar. 24, 1992

[54] AIR/LIQUID HEAT EXCHANGER WITH RAM PRESSURE EVAPORATIVE COOLING

[75] Inventor: Henry E. Beamer, Middleport, N.Y.

[73] Assignee: General Motors Corporation, Detroit, Mich.

[21] Appl. No.: 653,589

[22] Filed: Feb. 11, 1991

[51] Int. Cl.⁵ .................. B64D 33/10; F28D 5/00
[52] U.S. Cl. .................................... 165/44; 165/41; 165/911; 62/304; 62/259.4; 62/241; 62/DIG. 5; 123/41.01; 261/153; 244/57
[58] Field of Search .................. 165/41, 44, 911, 912; 62/259.4, 304, 305, 241, DIG. 5; 123/41.01; 261/153; 244/57

[56] References Cited

U.S. PATENT DOCUMENTS

| 2,925,722 | 2/1960 | Blackburn et al. | 165/41 |
| 3,769,947 | 11/1923 | Crain | 62/304 |
| 4,031,710 | 6/1977 | Rideout | 62/171 |
| 4,494,384 | 1/1985 | Lott | 62/279 |

Primary Examiner—Albert W. Davis, Jr.
Attorney, Agent, or Firm—Ronald L. Phillips

[57] ABSTRACT

An air/liquid heat exchanger for aircraft having ram pressure powered evaporative cooling.

3 Claims, 1 Drawing Sheet

AIR/LIQUID HEAT EXCHANGER WITH RAM PRESSURE EVAPORATIVE COOLING

TECHNICAL FIELD

This invention relates to air/liquid heat exchangers and more particularly to those with evaporative cooling for high performance aircraft.

BACKGROUND OF THE INVENTION

One way of significantly enhancing the performance of air/liquid heat exchangers is to install one or more spray tubes to spray a liquid onto their heat transfer surface to thereby utilize the latent heat of evaporation of this liquid to boost the heat transfer. The sprayed liquid is vaporized as it passes through the air side flow circuit of the heat exchanger, and the heat removed through evaporation is added to the sensible heat removed by the normal cooling air. This performance enhancement can be used to increase the overall heat transfer capacity of the heat exchanger and/or reduce the cooling air mass flow required while maintaining constant heat transfer performance.

For example, in high performance piston engine powered/propeller driven aircraft where sufficient heat transfer performance is available to cool the engine(s) without evaporative cooling, a very significant reduction in the air drag on the aircraft can be achieved with the addition of evaporative cooling by the resulting reduction in the cooling air then required for the heat exchanger(s). This can be a very significant advantage recognizing that the heat exchanger(s) on a high performance aircraft can represent as much as about 50% of the total drag. However, the evaporative cooling would also normally add the complexity, weight and power consumption of a separate pump to power the spray tubes in such an application.

SUMMARY OF THE INVENTION

The present invention provides a very simple solution that eliminates the complexity, weight and the power consumption of a separate evaporative cooling pump. Instead of a pump, advantage is taken of the ram air pressure on the air frame by utilizing same to act as the head pressure on the evaporative cooling liquid to force its required flow rate and spraying onto the heat exchanger core. As a result, the valve controlling the flow may be either a simple needle valve or fixed orifice as a regulator valve is not required with this constant motive force.

It is therefore an object of the present invention to provide a new and improved evaporative cooled air/liquid heat exchanger.

Another object is to provide an air/liquid heat exchanger for a high performance aircraft having ram pressure forced evaporative cooling.

These and other objects, advantages and features of the present invention will become more apparent from the following detailed description and accompanying drawing.

DESCRIPTION OF THE PREFERRED EMBODIMENT

Figure 1:
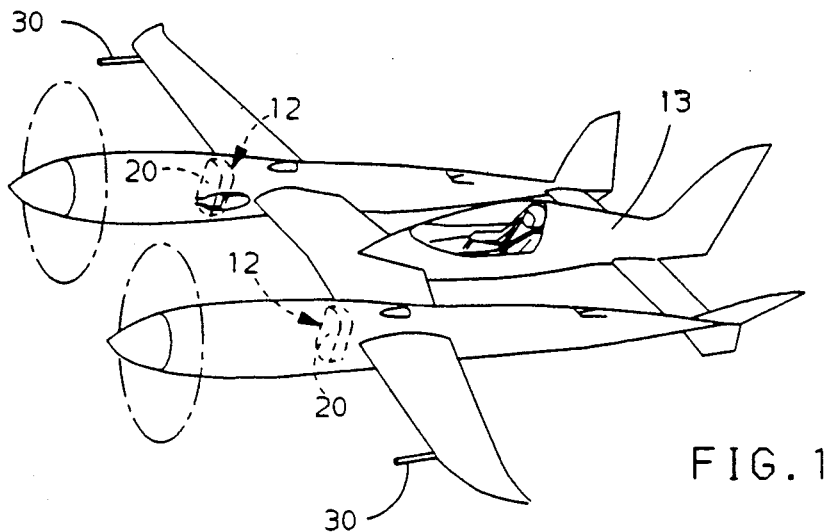
FIG. 1 is a perspective view of a high performance aircraft with air/liquid heat exchanger evaporative cooling systems embodying the present invention.
Figure 2:
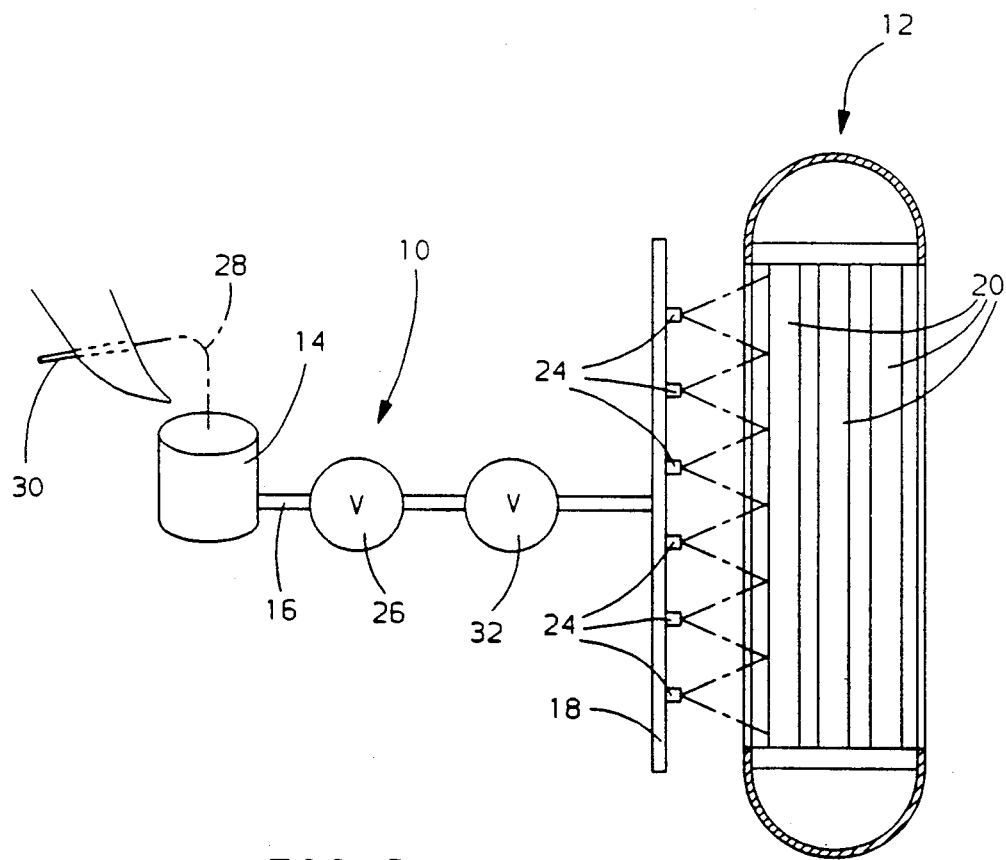
FIG. 2 is a schematic view of the air/liquid heat exchangers in FIG. 1.

Referring to the drawing, there is shown an evaporative cooling system 10 for a radiator 12 of a high performance piston engine powered/propeller driven aircraft 13. The system 10 comprises an evaporative cooling liquid supply tank 14 connected by a pipeline 16 to one or more spray tubes 18 (only one being shown) arranged across the upstream face of the radiator. The radiator 12, which is connected with the aircraft engine's cooling circuit, is of a conventional type with a tube and air center core 20 onto which nozzles 24 formed on the spray tubes along the length thereof are directed to spray liquid from the supply tank for evaporative cooling.

The evaporative cooling liquid is preferably water or a water-alcohol solution and is selectively supplied to the spray tubes by an on/off valve 26. The top of the tank 14 is connected by a conduit 28 to a ram tube 30 that is located on the air frame such as at the wing tip as shown where there is a stagnation pressure sufficiently high enough to pressure the tank 14 for the required evaporative flow rate to spray the radiator core. Control of this flow rate is simply provided by sizing of the nozzles 24 and/or a needle valve (or fixed orifice) 32 in the line between the on/off valve and the spray nozzles. A regulator valve is not needed because of the constancy of the stagnation pressure.

The improved aircraft performance that can result from use of the above evaporative liquid cooling can be very significant. For example, it is projected that on a special piston engine powered/propeller driven aircraft designed to challenge the speed record where the heat transfer performance of the radiator design is sufficient without evaporative cooling, the addition of the above ram pressure induced evaporative liquid cooling can reduce the cooling air required by about 25% resulting in a significant reduction in the heat exchanger induced aerodynamic drag on the aircraft, without complexity and minimal added weight.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. For example, ram pressure induced evaporative cooling is also applicable to other air/liquid heat exchangers such as an air side oil cooler or special condenser requiring high heat transfer capacity for only short time durations. All such modifications and variations are within the scope of the invention as determined by the appended claims when interpreted in accordance with the breadth to which they are fairly, legally and equitably entitled.

I claim:

1. An aircraft, an air/liquid heat exchanger for a high performance engine powering said aircraft, and liquid supply means powered by ram pressure on the aircraft for selectively spraying an evaporative liquid onto the heat transfer surface of said heat exchanger to effect evaporative cooling.

2. An aircraft, an air/liquid heat exchanger for a high performance engine powering said aircraft, and liquid supply means including an evaporative liquid containing tank and an air duct connecting said tank to a surface on the aircraft that experiences a significant ram pressure for selectively spraying the liquid in the tank onto the heat transfer surface of said core with the power of said ram pressure to effect evaporative cooling.

3. In combination, an aircraft having a radiator for the cooling system of a high performance piston engine powering the aircraft, a surface on the aircraft experiencing a significant ram pressure, and evaporative liquid supply means powered by said ram pressure for selectively spraying an evaporative liquid onto the heat transfer surface of said radiator to effect evaporative cooling.

* * * * *